UNITED STATES PATENT OFFICE.

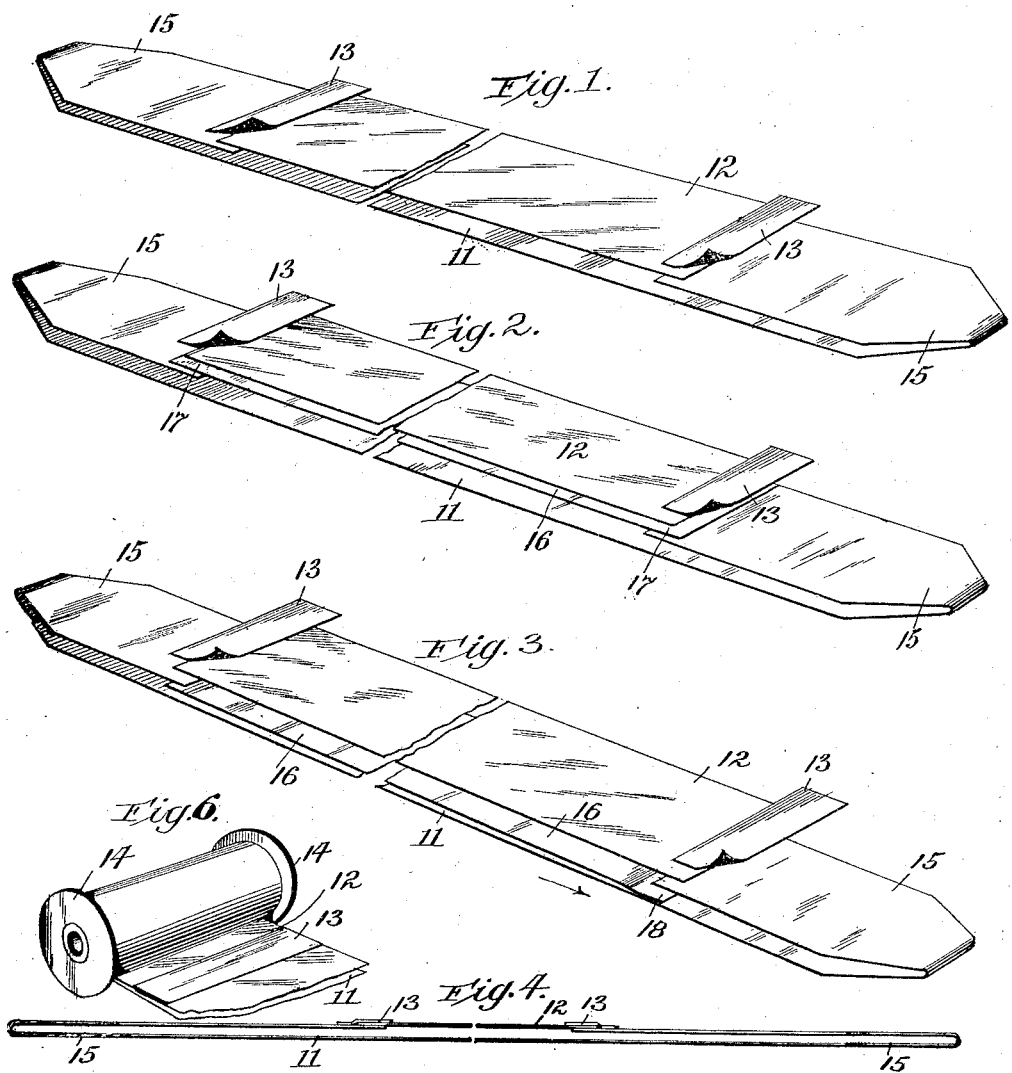

ARTHUR W. McCURDY, OF VICTORIA, BRITISH COLUMBIA, CANADA.

ROLL-FILM.

1,329,785.  Specification of Letters Patent.  Patented Feb. 3, 1920.

Application filed April 18, 1916, Serial No. 92,004. Renewed May 1, 1919. Serial No. 294,096.

*To all whom it may concern:*

Be it known that I, ARTHUR W. MC-CURDY, a subject of the King of England, residing at Victoria, British Columbia, Dominion of Canada, have invented a certain new and useful Improvement in Roll-Films, of which the following is a specification.

This invention relates to photographic films and particularly to improvements in roll film cartridges.

The purpose of the invention is so to arrange the film and the protecting paper that the film shall not be attached directly to the protecting paper at either end, but shall be free to move slightly relatively thereto as the film is wound through the camera. This prevents buckling or creasing of the film such as now often occurs, and causes a more free and compact winding of the film and paper, as the film is wound in a camera. It also permits better winding into the apron of a developing machine or tank because a progressive creep between the film and protecting paper can occur and can continue past the ends of the film proper, so that there will be no bunching of the paper particularly at the "forward" end of the film such as occurs when such "forward" end, which enters the apron last, is attached directly to the protecting paper. By the "forward" end of the film I mean that adjacent the No. 1 exposure, the forward end as it passes through the camera.

Certain types of roll film now known or used include a "stencil sheet" of paper intervening between the film and the protecting paper and used to impress written notations upon the film, either by photographic or mechanical action. A subsidiary feature of my invention is the mode of attaching or mounting such sheets.

In the drawings I illustrate the simplest arrangement, lacking the stencil sheet, and two alternative constructions including this sheet.

Figure 1 is a perspective view of the film protecting paper, and attaching strips shown slightly separated;

Figs. 2 and 3 are similar views of film structures including stencil sheets;

Fig. 4 is an edge view of the arrangement shown in Fig. 1 after attachment of its parts;

Fig. 5 is a similar view of the arrangement shown in Fig. 2;

Fig. 6 is a perspective view illustrating how the film and paper are wound on the cartridge spool.

In the drawings the end portions of the protecting paper, *i. e.*, those portions which extend beyond the film proper, are shown much shorter than they would be made in practice, in order that the scale of the drawing may be made large. These portions must, of course, be of length sufficient to permit threading up and unloading the camera, without exposing the film to the light, as is fully understood by those skilled in the art.

Referring first to Figs. 1 and 4, 11 represents the protecting paper which is folded back at its ends to meet and slightly overlap the ends of the film 12. The overlapping ends are connected in any suitable manner, gummed or adhesive strips 13 being shown, these having proved satisfactory in use.

The protecting paper is tapered to enter the slot in cartridge spool 14 (see Fig. 6) where this paper is folded back upon itself, as shown at 15.

The stencil sheet is preferably interposed between the protecting paper and the film. In Figs. 2 and 5 I show a stencil strip 16, of any suitable kind. This is slightly longer than the film 12, so as to be fastened at its ends 17 to the infolded ends of the paper 11 by the same adhesive strips 13 which attach the film 12.

In Fig. 3 I show an alternative construction in which the stencil strip 16 is attached at 18 to the protecting paper proper, rather than to the infolded ends thereof. The stencil strip may be attached at one or both of its ends, but preferably, as shown, only at the "forward" end.

The attachment of the forward end in the manner described secures ready accommodation to the spool flanges in the camera, and freedom from bunching of the paper at the forward end of the film in a developing machine.

The tapering of the protecting paper at the folds not only permits ready insertion into the spool slot, but also reduces the stiffness of the paper at and near the fold and thus allows the creep between the film and paper to continue to the final extremity of the folded strip.

An important feature of the invention is the provision of a floating extension strip. This is the greatest importance at the forward end of the film. A relatively flexible strip connected at one end to the film and at the other and relatively remote end to the protecting strip permits the necessary creep between the film and protecting strip. Where this creep is not permitted bunching occurs both in the roll camera and in the developing machine, and this bunching is the cause of many of the failures occuring in the use of such apparatus.

The constructions described are peculiarly advantageous, because while the film is held in proper relation to the protecting paper and the indicating numbers carried thereby, it is still free to creep in any direction the slight amount necessary to prevent buckling and creasing, and to permit it to enter smoothly between the flanges of the spool. In prior constructions, if there was even slight inaccuracy in attaching the film end to the protecting paper, the film would wind badly throughout its length. In the present construction the film adjusts itself to the spool flanges at once. In certain types of so called "autographic" film the protecting paper is necessarily thin. In such cases the double thickness of protecting paper at the ends prevents fogging in loading and unloading the camera.

Certain advantages of the invention can be secured by attaching the forward end of the film in the manner described herein, regardless of the mode of attaching the rear end, though the fullest advantages are secured by attaching both ends in the same manner.

Having thus described my invention, what I claim is:—

1. A film cartridge prepared for exposure and comprising in combination, a strip of unexposed photographic film; a protecting strip longer than said film strip; a flexible extension strip of substantial length connected at its rear end to the forward end of the film strip, and connected at its forward end to the protecting strip, there being a portion of the extension strip free from both the film and protecting strip between such points of connection; and a spool upon which said film and strips are wound together, with the forward end of the protecting strip outermost and the rear end of the film strip free of direct connection to the protecting strip.

2. A film cartridge prepared for exposure and comprising in combination a strip of unexposed photographic film; a protecting strip longer than said film strip, folded back near its forward end, and attached at the extremity of such folded-back portion at the forward end of said film strip; and a spool upon which said strips are wound together with their forward ends outermost, the double or back-folded portion of the protecting strip extending beyond the film strip and being accessible at the surface of the film cartridge and the rear end of the film strip being freely movable with reference to the adjacent portion of the protecting strip.

3. A film cartridge prepared for exposure and comprising in combination a strip of unexposed photographic film; a protecting strip longer than said film strip, folded back near its forward end, and attached at the extremity of such folded-back portion to the forward end of said film strip; and a spool upon which said strips are wound together with their forward ends outermost, the double or back-folded portion of the protecting strip extending beyond the film strip and being tapered or narrowed at the fold to enter the receiving spool of a camera, and the rear end of the film strip being freely movable with reference to the adjacent portion of the protecting strip.

4. A film cartridge comprising in combination a strip of photo-sensitive film; extension strips connected to the ends of said film; a protecting strip longer than said film strip and connected to the ends of said extension strips remote from said film, there being a portion of each extension strip free from both film and protecting strip between its point of attachment to the film and its point of attachment to the protecting strip; and a spool on which said film and strips are wound together.

5. A film cartridge comprising in combination a strip of photographic film; a protecting strip longer than said film strip, folded back near its ends, and attached at the extremities of such folded back portions to the ends of said film strip; and a spool upon which said strips are wound together.

6. A film cartridge comprising in combination a strip of photographic film; a protecting strip longer than said film strip, folded back near its ends, and attached at the extremities of such folded back portions to the ends of said film strip, said protecting strip being narrowed or tapered at such folds; and a spool upon which said strips are wound together.

7. A film cartridge comprising in combination a photo-sensitive film, extension strips connected to the ends of said film, a protecting strip extending the entire length of said film and extension strips; a stencil strip connected with said protecting strip and free from said film; and a spool on which said film and strips are wound together.

8. A film cartridge comprising in combination a photo-sensitive film, extension strips connected to the ends of said film, a protecting strip extending the entire length of said film and extension strips; a stencil strip connected at its forward end only with said protecting strip; and a spool on which said film and strips are wound together.

In testimony whereof I have signed my name to this specification.

ARTHUR W. McCURDY.